United States Patent [19]

Lein

[11] Patent Number: 4,772,923
[45] Date of Patent: Sep. 20, 1988

[54] AUTOMATICALLY OPERATED VACUUM FEED AND HOLD DOWN ASSEMBLY FOR CAMERA SYSTEM

[75] Inventor: Juergen Lein, West Henrietta, N.Y.

[73] Assignee: Itek Graphix Corp., Waltham, Mass.

[21] Appl. No.: 96,815

[22] Filed: Sep. 10, 1987

Related U.S. Application Data

[63] Continuation of Ser. No. 65,670, Jun. 25, 1987, abandoned, which is a continuation of Ser. No. 920,118, Oct. 17, 1986, abandoned.

[51] Int. Cl.$^4$ .................................................. G03B 27/60
[52] U.S. Cl. .................................... 355/73; 355/28; 355/29
[58] Field of Search ............................. 355/28, 29, 73

[56] References Cited

U.S. PATENT DOCUMENTS

| | | |
|---|---|---|
| 1,234,416 | 7/1917 | Sweigard . |
| 2,287,271 | 6/1942 | Powers . |
| 2,519,610 | 8/1950 | Sussin . |
| 3,369,449 | 2/1968 | Klauss . |
| 3,420,608 | 1/1969 | Canale . |
| 3,468,606 | 9/1969 | Wolf . |
| 3,472,590 | 10/1969 | Fairbanks et al. . |
| 3,536,401 | 10/1970 | Mason . |
| 3,617,127 | 11/1971 | McDuff . |
| 3,722,999 | 3/1973 | Cunha et al. . |
| 3,922,087 | 11/1975 | Dillow . |
| 4,018,523 | 4/1977 | Hughes . |
| 4,089,603 | 5/1978 | Jacobs . |
| 4,175,857 | 11/1979 | Rapp . |
| 4,298,272 | 11/1981 | Stievenart et al. . |
| 4,324,487 | 4/1982 | Nishihama . |
| 4,353,647 | 10/1982 | Harrell et al. . |
| 4,362,380 | 12/1982 | Dragstedt . |
| 4,408,872 | 10/1983 | Vaughan . |
| 4,412,738 | 11/1983 | Ahern . |
| 4,478,511 | 10/1984 | Miyauchi . |
| 4,479,710 | 10/1984 | Vaughan . |
| 4,529,300 | 7/1985 | Borjesson . |
| 4,619,526 | 10/1986 | Hougaard . |
| 4,640,610 | 2/1987 | Rasmussen et al. ............... 355/73 |

FOREIGN PATENT DOCUMENTS

2052125 10/1971 Fed. Rep. of Germany .
2253125 5/1974 Fed. Rep. of Germany .

OTHER PUBLICATIONS

IBM Technical Disclosure Bulletin, vol. 14, No. 7, Dec. 1971.
"The Dawn of a New Age in Vertical Camera Technology", Visual Graphics Corporation brochure, Tamarac, Florida.

Primary Examiner—Monroe H. Hayes
Attorney, Agent, or Firm—Morgan & Finnegan

[57] ABSTRACT

An automatically operated vacuum feed system for cameras is disclosed. Such system includes an opaque, flexible transport belt that is secured between rollers situated at opposite sides of the platen of the camera. A manifold is secured to a vacuum pick-up bar that is adhesively joined to the transport belt, and a central bore and depending channels are defined in the bar.

The channels are aligned with openings passing through the belt so that suction forces can be introduced to the underside of the belt to cause photosensitive materials to adhere thereto. The pick-up bar is suspended between a pair of C-shaped tracks that is secured inboard of a pair of side frames for a rigid belt frame. Lift links join the tracks to the side frames, and a lift motor periodically elevates the tracks, thus lifting the manifold and the belt.

A reversible motor, a drive sprocket, idlers, and an endless chain are situated outboard of one of the side frames. The motor drives the sprocket which drives the chain in one direction, and then the other. This motion is mechanically transmitted to the rollers for the transport belt and causes them to pay out, or take up, the transport belt.

The transport belt, without the intervention of a human operator, picks up, advances, raises and lowers, a sheet of photosensitive material relative to the platen of the camera through a series of distinct, operational steps. The emulsion side of the photosensitive material is not marred, and exposures of increased clarity are obtained.

28 Claims, 6 Drawing Sheets

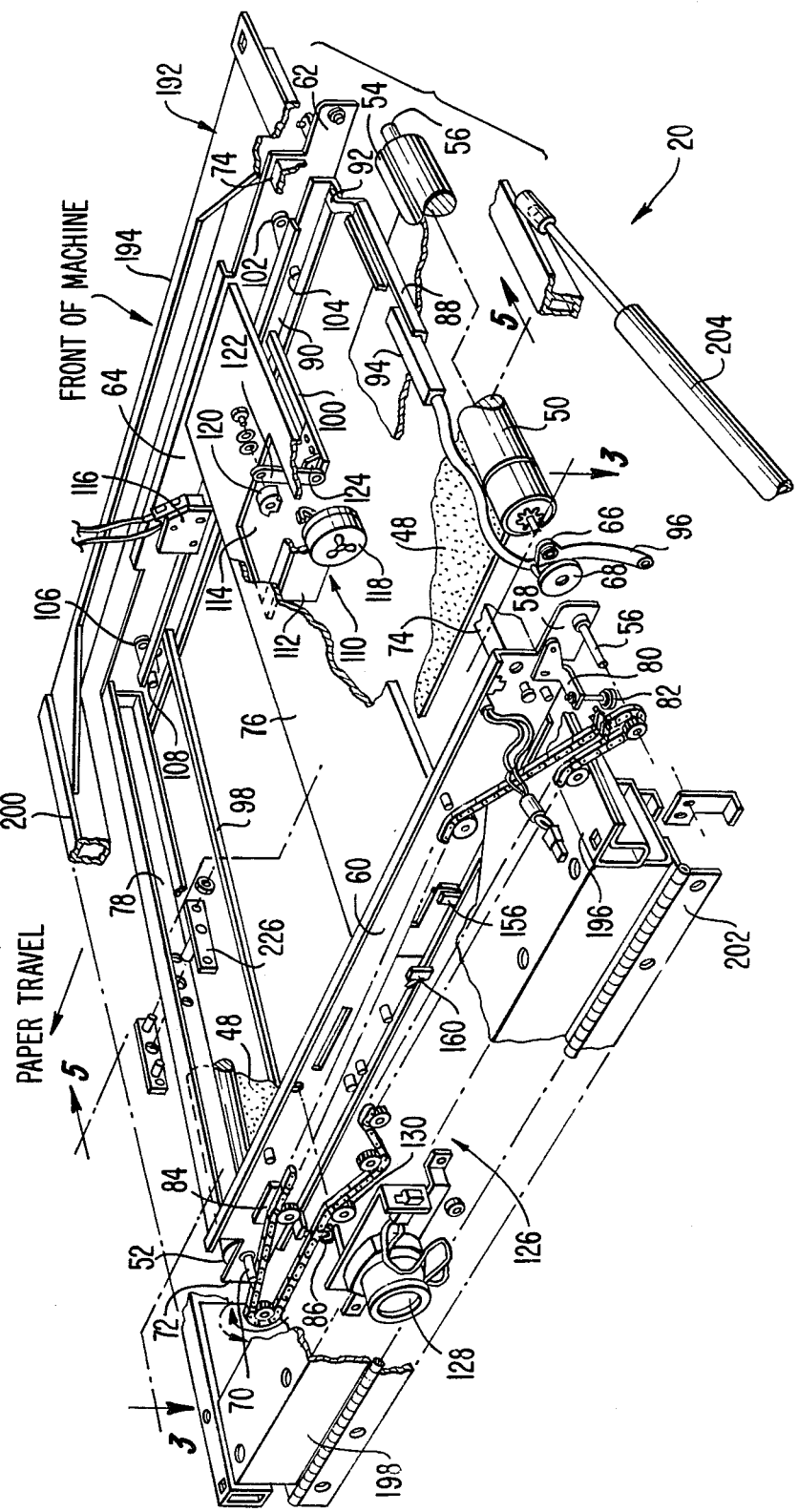

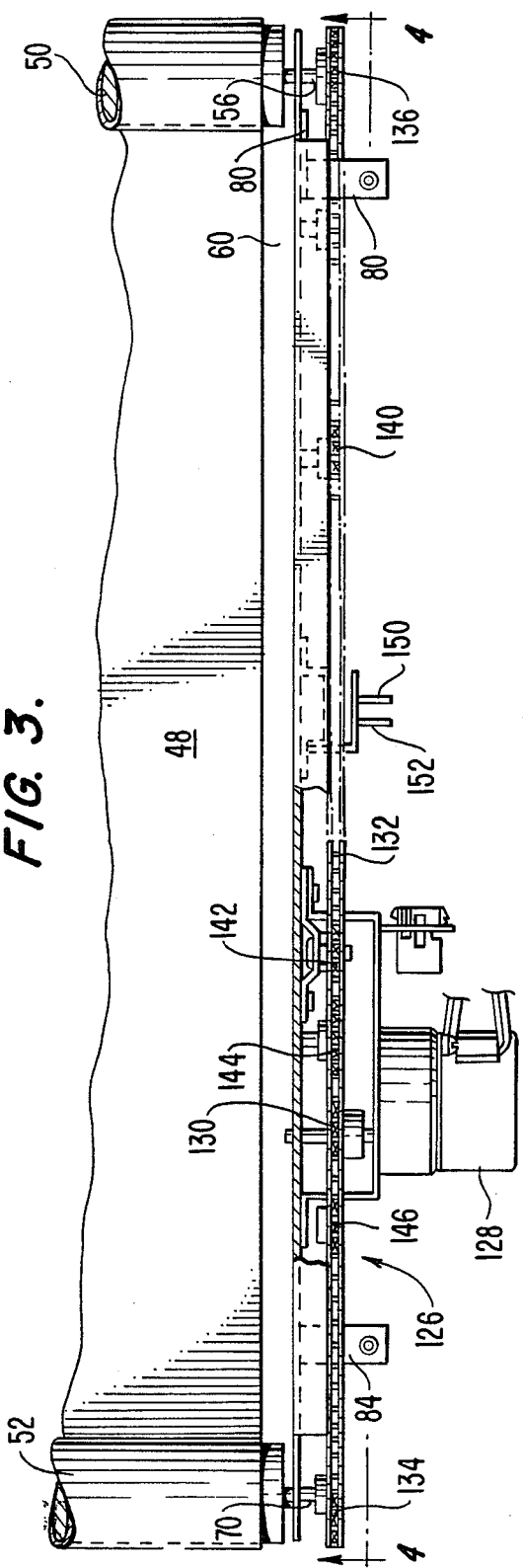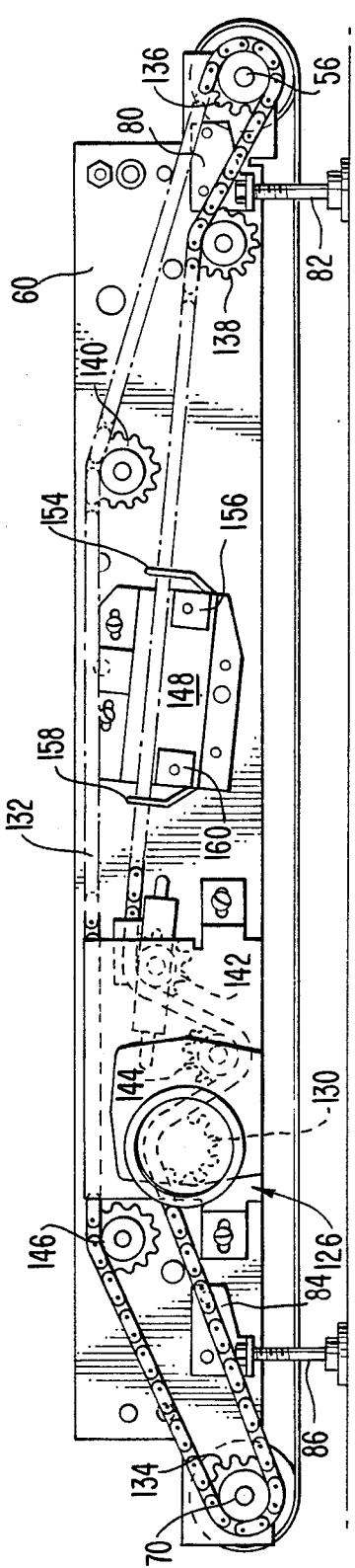

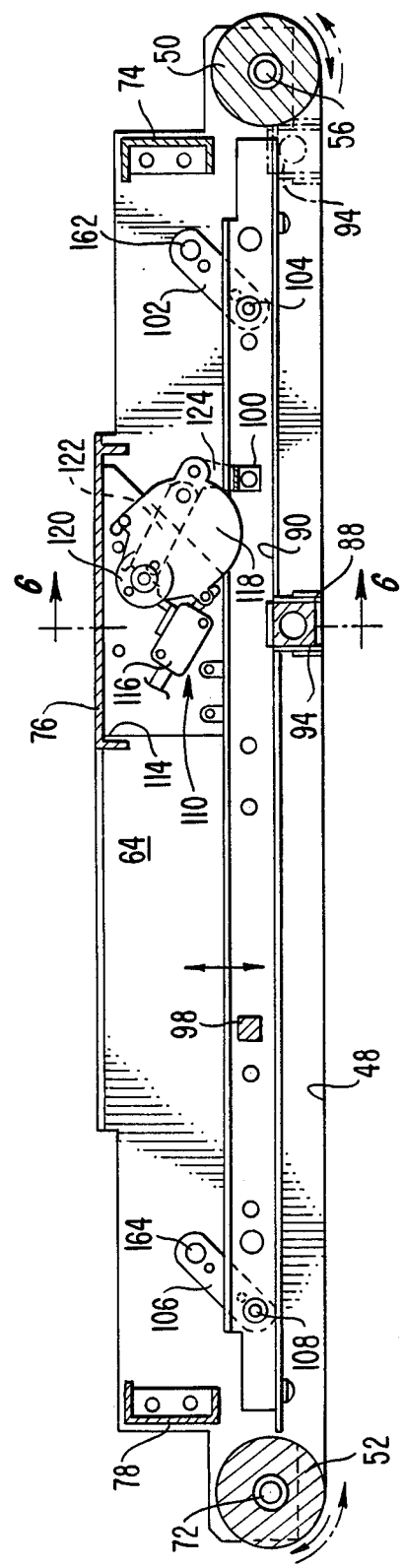

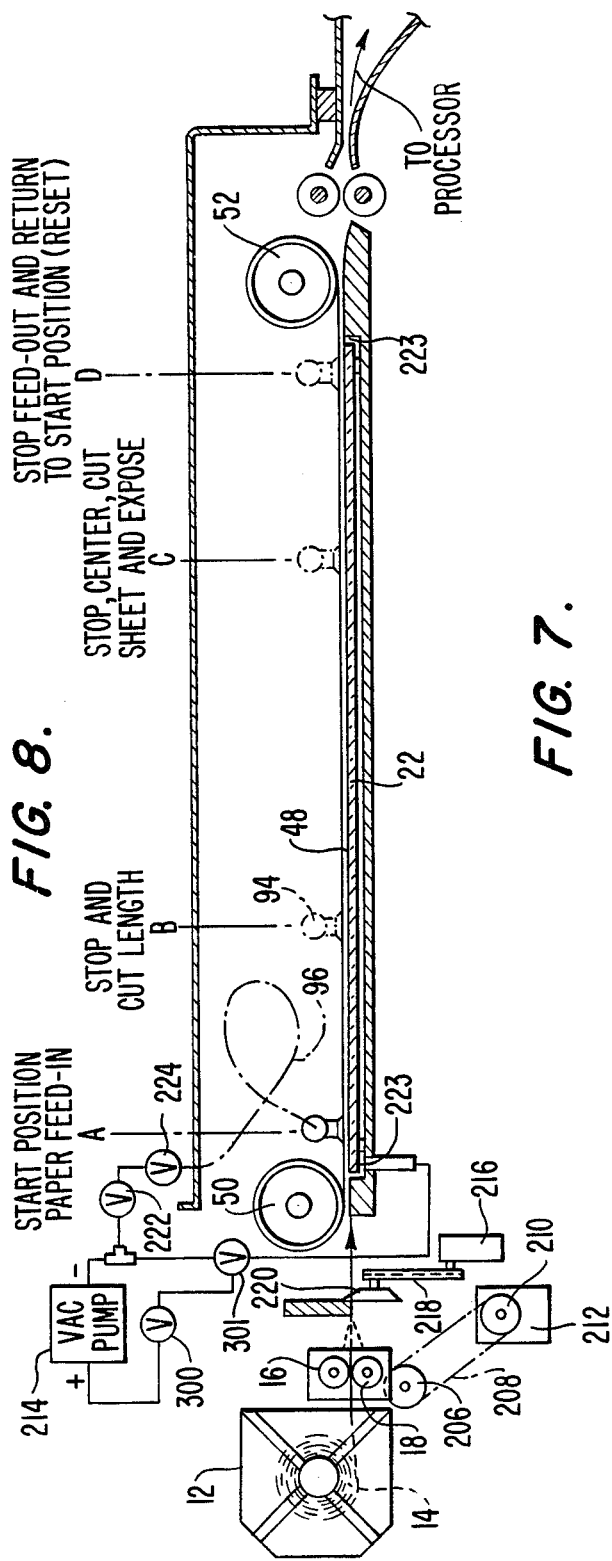
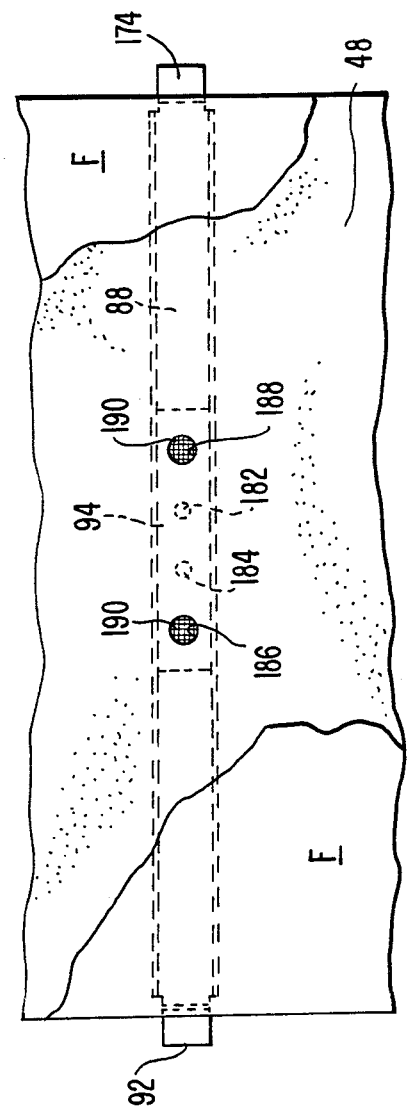

1

AUTOMATICALLY OPERATED VACUUM FEED AND HOLD DOWN ASSEMBLY FOR CAMERA SYSTEM

This is a continuation of co-pending application Ser. No. 065,670, filed on June 25, 1987, now abandoned, which is a continuation of application Ser. No. 920,118, filed on Oct. 17, 1986, now abandoned.

BACKGROUND OF THE INVENTION

1. Field of the Invention

The present invention relates generally to daylight cameras, and more particularly to vacuum feed assemblies which automatically transport photosensitive materials through the sequence of operations of such cameras.

2. Description of the Prior Art

The commercial appeal of a daylight camera that could automatically remove film from a storage receptacle, cut same to length, expose same, and transport the exposed film to a developer station has long been recognized. However, such objective has not yet been realized, although progress has been made in this quest by numerous conventional graphic arts systems. As an example, U.S. Pat. No. 4,089,603 granted May 16, 1978 to Robert D. Jacobs, and now assigned to Itek Graphix Corp. of Waltham, Mass., discloses a high speed vacuum support assembly for platemakers. The apparatus includes a first cover plate assembly having a transparent cover plate, and a second backing plate assembly including a relatively flexible backing sheet. The cover plate assembly is driven, by a motor, into contact with the photosensitive sheet supported therebetween, so that an airtight chamber is defined therebetween. The airtight chamber is evacuated (by a vacuum source) so that the flexible backing plate will be sucked toward the cover plate assembly, and drive the photosensitive sheet into film contact with the transparent cover plate.

U.S. Pat. No. 4,408,872, granted Oct. 11, 1983 to Quentin D. Vaughan, and assigned to Visual Graphics Corporation of Tamarac, Fla. discloses a vertically oriented, daylight camera system of particular relevance. This patent discloses a system in which a camera supports a table along which a cassette carriage is manually propelled. The carriage serves to store, and feed out, lengths of photosensitive material into a camera exposure station.

A source of vacuum acting between a sheet of flexible, opaque plastic material and a translucent glass platen for the camera at the exposure station causes the film to be flattened against the platen prior to film exposure. Thereafter, vacuum is broken by movement of the carriage, and the exposed film is urged into the nip of rollers which carry the film through a developing station supported by the table. The exposed film is advanced toward the developing station by a brush-like member which picks up the trailing edge of the film; the brush-like member is secured beneath carriage 26.

U.S. Pat. No. 4,479,710, granted Oct. 30, 1984 to Quentin D. Vaughan, discloses refinements in the daylight camera system disclosed in U.S. Pat. No. 4,408,872, also granted to Quentin D. Vaughan and assigned to Visual Graphics Corporation of Tamarac, Fla. For example, U.S. Pat. No. 4,479,710 discloses protuberances formed on the underside of the flexible, opaque plastic sheet that is advanced by the manually operated cassette carriage across the platen of the camera; the protuberances insure smooth passage of the photosensitive material as it slides across the platen beneath the plastic sheet. U.S. Pat. No. 4,479,710 also discloses an elongated vacuum bar that assists in removing air from beneath the plastic sheet, as well as to be more easily lifted from the platen after the vacuum draw-down is terminated.

While the two patents granted to Quentin D. Vaughan represent improvements over previously known graphic arts systems, the Vaughan cameras rely upon manual operation of a cassette carriage in order to advance a length of photosensitive material, cut same to length, and advance the exposed film to a processing station. The back and forth movement of the cassette carriage across the table of the camera requires the continued presence of an operator, and increases the cost of operating the camera. The need to move the carriage in finite steps, to distinct locations on the table of the camera, calls for careful operation of the camera system, and reduces, potentially, the operational speed of the system. Also, to maintain the light-tight characteristic of the daylight camera system, Vaughan relies upon an elongated, flexible opaque sheet of plastic that is unwound from a roller situated at the rear of the cassette carriage; the effectiveness of this seal may diminish after extended use and stray light may enter the camera system.

SUMMARY OF THE INVENTION

The present invention sets forth a vacuum feed assembly for daylight camera system that automatically withdraws a length of photosensitive material from a supply roll, pauses while the material is cut to length, centers the sheet of material cut to length on the platen of the camera, assists in drawing-down the photosensitive material against the platen, and then lifts and advances the exposed sheet of photosensitive material (cut to size) to the processing section of the camera. The vacuum feed assembly includes a transport belt with two apertures defined therethrough; an air manifold block, with two vertical channels and a central bore, is operatively associated with the transport belt. An air hose is secured to the manifold block, and introduces suction pressure through the apertures to the photosensitive material being transported by the belt.

The transparent belt is opaque, flexible and keeps stray light from passing through the platen of the camera. The belt is wider than the platen to increase its effectiveness, and extends between a first roller at one end of the platen and a second roller at the opposite end of the platen. The belt is compliant and conforms to the curvature of the roller about which it is being wrapped.

A vacuum pick-up bar is secured to the upper surface of the transport belt and travels therewith. The bar extends across the width of the belt, and the ends of the bar rest on a pair of spaced C-shaped tracks. Lifting links join the tracks to a rigid lifting frame that surrounds the tracks. A lift motor operates a drive link that raises the tracks and elevates the manifold block and belt, and the photosensitive material positioned therebelow. This precise raising and lowering operation takes place automatically, and at the desired points, in the cycle of operation for the daylight camera system.

A rigid belt frame is provided for the transport belt. Such frame includes three cross-members, including one that supports the lift motor, and two side frames. Four adjustable feed, one at each corner of the rectangular belt frame, keep the belt frame parallel to the glass platen of the camera and enhance the quality of the exposure.

A chain extends about sprockets secured to the exterior of one of the side frames of the rigid belt frame, whereas the transport belt, and the rollers for the transport belt, are situated within the confines of the belt frame. A reversible motor drives the sprockets and advances the chain; the movement of the train is transmitted to both of the rollers about which the transport belt is secured. The roller winds up, or pays out, the transport belt. Lugs on the chain cooperate with switches on the side frame to control the travel of the transport belt.

A large, generally rectangular main frame extends about the belt frame. The main frame is hinged to the frame of the camera system, and can be pivoted upwardly to provide access to the transport belt assembly, the rigid belt frame, etc. An air cylinder is provided to retain the main frame in its opened position, and to permit the gradual lowering thereof.

The above-described vacuum feed assembly realizes its stated objective of automatically withdrawing photosensitive material, cutting same to a desired length, centering the sheet of material on a glass platen, uniformly drawing down the sheet of material against the platen of the camera, and picking up the exposed sheet material (cut to length) of photosensitive material, and advancing same onto the nip of rollers that will introduce the exposed material to a developing or processing station. Realization of this objective presages significant commercial appeal for the resultant daylight camera system utilizing this vacuum feed system, for costs associated with manufacturing and operating this camera will be significantly reduced while the quality of the photographic exposure will be enhanced.

Numerous other advantages, and favorable attributes of the vacuum feed assembly, will occur to the skilled artisan when the appended drawings are construed in harmony with the ensuing description of the invention.

BRIEF DESCRIPTION OF THE DRAWINGS

FIG. 2 is an exploded perspective view of a vacuum feed and hold down assembly constructed in accordance with the principles of this invention;

FIG. 3 is a fragmentary, top plan view of the transport belt of the vacuum feed and hold down assembly, such view being taken along line 3—3 in FIG. 2 and in the direction indicated;

FIG. 4 is a side elevational view of the drive chain for the vacuum feed and hold down assembly, such view being taken along line 4—4 in FIG. 3 and in the direction indicated;

FIG. 5 is a side elevational view of the lifting frame for the transport belt of the vacuum feed and hold down assembly, such view being taken along line 5—5 of FIG. 2 and in the direction indicated;

FIG. 6 is a transverse, cross-sectional view of the lifting frame, such view being taken along line 6—6 of FIG. 5 and in the direction indicated;

FIG. 7 is a fragmentary, bottom plan view of the transport belt, such view being taken along line 7—7 in FIG. 6 and in the direction indicated;

FIG. 8 is a schematic view of the sequence of operations performed by the vacuum feed assembly.

DESCRIPTION OF THE PREFERRED EMBODIMENT

Figure 1:
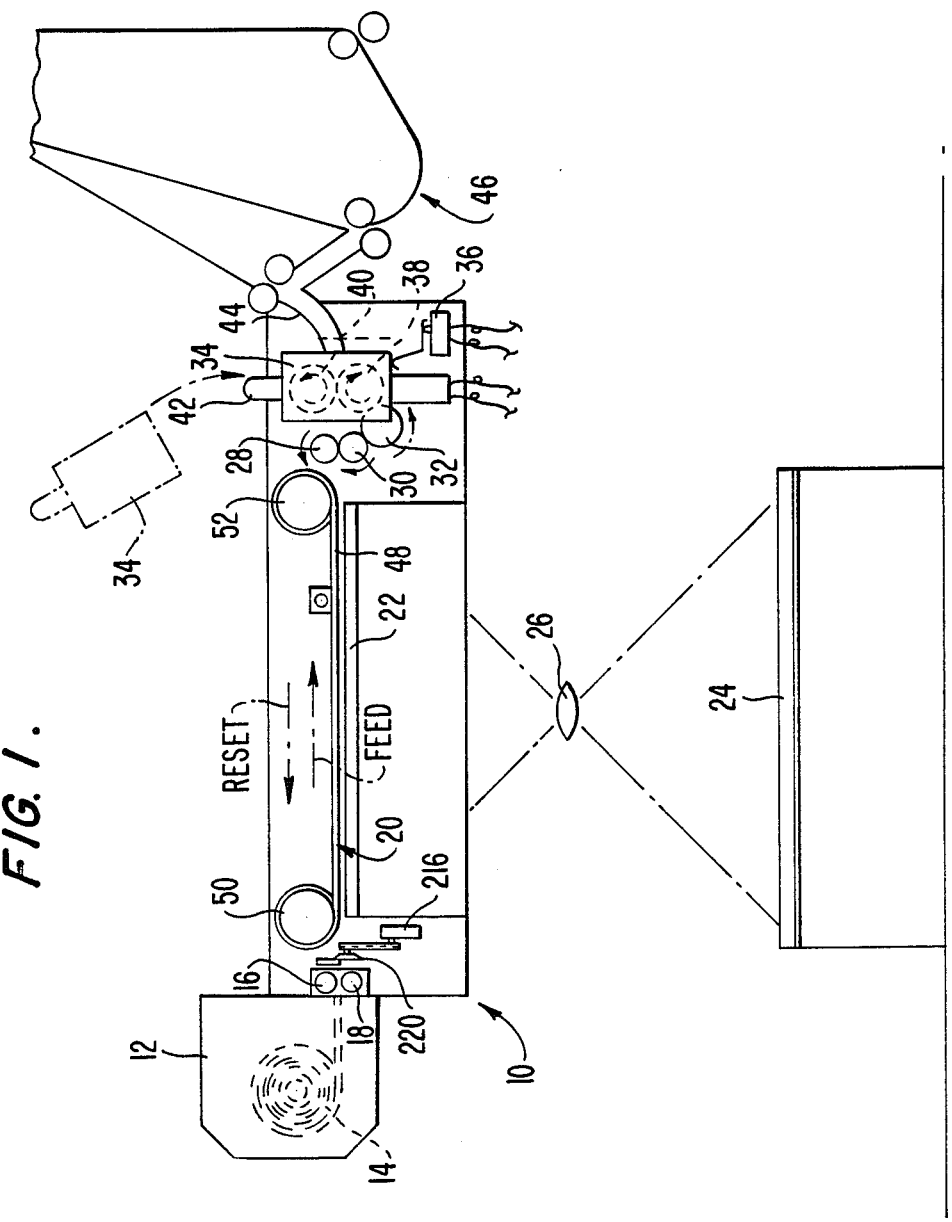
FIG. 1 is a schematic front elevational representation of a camera system within which the instant vacuum feed and hold down assembly may be utilized.

Turning now to the drawings, FIG. 1 depicts, in general schematic fashion, a known vertical configuration for a daylight camera system 10 which may be adapted to receive, and utilize, the present invention.

Camera system 10 includes a receptacle to receive, and retain, a cassette 12 containing a roll 14 of photosensitive material. Rollers 16, 18 are driven by a small motor (not shown) to withdraw a length of photosensitive material. A predetermined length of photosensitive material is then cut by a knife blade (not shown), and a transport mechanism 20, such as a belt, advances the cut length of material onto a glass platen 22. The sheet of material, cut to length, is centered on the platen, and then is positively forced, or drawn down by suction, to press firmly against the platen.

Graphic material is arranged on illuminated copyboard 24, and the camera, represented by lens 26, is adjusted relative to the copyboard. An exposure is then achieved, and the image is recorded on the sized sheet of photosensitive material. The exposed sheet of photosensitive material is then advanced by the transport belt 48 into the nip defined between rollers 28, 30. Rollers are power driven by another small motor (not shown). A compound gear 32 is operatively associated with the rollers 28, 30.

When the operator wishes to make a plate for multiple impressions, a removable transfer cartridge 34 is inserted into the camera system to receive the exposed lengths of photosensitive materials. The cartridge, which trips a switch 36 when inserted into the system, uses gears 38, 40 to drive rollers (not shown) within the cartridge to take up the photosensitive material in a light-tight enclosure. The cartridge is picked up by handle 42 and removed to an alternative processor for completing the platemaking process.

Under usual conditions of operation, however, cartridge 34 will be absent, and the rollers 28, 30 will propel the sheet of exposed photosensitive material into guide 44, which leads into developer section 46.

FIGS. 2–7, and particularly FIG. 2, depict the details of the vacuum feed assembly 20. In accordance with the principles of the present invention, the assembly 20 assumes the form of a belt 48 that extends between a first roller 50 and a second roller 52. One end of the belt fits within a groove 54 in roller 50, or is otherwise secured thereto, while the opposite end of belt 48 fits within a groove in roller 52, or is otherwise secured thereto. The belt is opaque, preferably black, and is longer and wider than the glass platen 22, to prevent stray light from entering the camera. The belt is a laminate of plastisol and polyester fabric, so that the belt can conform to the surface of the rollers 50, 52 as it is wrapped thereabout and to the platen support.

An elongated shaft 56 extends laterally through roller 50. One end of shaft 56 projects through an ear 58 on first side frame 60, while the opposite end of shaft 56 projects through an ear 62 on second, opposing side frame 64. A torsion spring 66 and a collar 68 are slipped onto shaft 56 so that an elastic coupling is formed between roller 50 and shaft 56.

An elongated shaft 70 extends laterally through roller 52. One end of shaft 70 projects through an ear 72 on first side frame 60, while the opposite end of shaft 70 projects through an ear (not shown) on opposing side frame 64. Roller 52 is pinned to shaft 70.

A rigid frame surrounds the belt 48. Such frame comprises a first side frame 60, and a second side frame 64; to maintain the side frames parallel, three cross-members are used to complete the frame. The first cross-member is indicated by reference numeral 74 and is situated close to roller 50, while a second, centrally located cross-member is indicated by reference numeral 76, and the third cross-member is designated 78. Cross-members 74 and 78 are similar in shape, while cross-member 76 is considerably larger in size.

A first L-shaped bracket 80 is secured to side frame 60 adjacent to ear 58, and a support foot 82 extends upwardly through the bracket. A second L-shaped bracket 84 is secured to side frame 60 adjacent to ear 72, and a support foot 86 extends upwardly through the bracket. A third support foot (not shown) is secured to ear 62 on side frame 64, and a fourth support foot is secured to another ear at the opposite end of side frame 64. The support feet are adjusted vertically so that the rigid belt frame, and the transport belt 48 associated therewith, can be maintained parallel to platen 22 (visible in FIG. 1, but not shown in FIG. 2).

A vacuum pick-up bar 88 is secured, by suitable adhesives, to the upper surface of belt 48. The bar is U-shaped when viewed in vertical cross-section; a first C-shaped track 90 disposed interiorly of side frame 64. Track 90 extends longitudinally along the side frame between cross-members 74 and 78. An identical C-shaped track (not shown) is disposed interiorly of side frame 60. One end 92 of vacuum pick-up bar 88 rests upon, and travels along, track 90. The opposite end of vacuum bar 88 rests upon, and travels along, the companion track associated with side frame 60. The ends of the vacuum pick-up bar terminate in upstruck ears.

A rectangular manifold 94 is secured by screws 182, 184 (see FIG. 6) and adhesives to the upper surface of bar 88, and fits securely within the U-shaped confines of the bar. An air hose 96 is secured to the manifold to establish communication between a vacuum source and the interior of the manifold.

Spacer bars 98, 100 extend between track 90 and the companion track located interiorly of side frame 60. A first lift link 102 is secured to the interior of the frame 64, and a pin 104 at the lower end of link 102 projects through an opening in track 90. A second lift link 106 is also secured to the interior of track 90, and a pin 108 at the lower end of link 106 projects through another opening in track 90 near cross-member 78. A third and fourth lift link (not shown) are secured to the interior surface of side frame 60 in a similar manner; the four lift links enable the tracks and the vacuum pick-up bar 88 extending therebetween to move a limited distance in a direction that is perpendicular to the plane of belt 48.

The mechanism that lifts the C-shaped tracks relative to side frames 60, 64 is shown in FIG. 2 and is identified generally by reference character 110. Assembly 110 includes a bracket 112 that is located in proximity to a rectangular aperture 114 in cross-member 76. A switch 116 is secured to bracket 112, as suggested by the dashed lead lines, and a lift motor 118 is secured in proximity to the bracket. Switch 116 controls the "on" and "off" operation of lift motor 118. A cam 120 is mounted on the shaft of lift motor 118, and a drive link 122 has one end secured to an upstanding tab 124 that is secured to spacer bar 100. Lift motor 118, through the cam and its eccentric operation of drive link 122, is able to raise, and lower, the C-shaped tracks, which pivot about the lift links joined to side frames 60 and 64.

The mechanism that drives rollers 50 and 52, and thus controls the movement of belt 48 secured between these rollers, is identified generally by reference number 126. Mechanism 126 is shown in FIG. 2, on a reduced scale, but is amplified and shown on an enlarged scale in FIGS. 3 and 4. Mechanism 126 is situated on the exterior of side frame 60.

Mechanism 126 includes a reversible motor 128 that drives a main drive sprocket 130. The sprocket 130 drives an endless linked chain 132 that extends between a sprocket 134 secured to the end of shaft 70 and a sprocket 136 secured to the end of shaft 56. Additional sprockets 138, 140, 142, 144 and 146 guide the link chain and preclude excessive play or sag.

A mounting bracket 148 is secured to side frame 60 in proximity to chain 132. Lugs 150, 152 project outwardly from the chain. When the chain is advanced in one direction by motor 128, lug 150 contacts arm 154 on switch 156 on bracket 148 and closes such switch. The switch closure causes the motor 128 to reverse direction, and through drive sprocket 130, the chain is driven in the opposite direction. Such motion continues until lug 152 contacts arm 158 on switch 160 on bracket 148 and closes such switch. The driving of the chain in one direction moves belt 48 from roller 50 onto roller 52, while the driving of the chain in the opposite direction reverses the direction of movement of belt 48.

FIG. 5 reveals additional details of the mechanism 110 that lifts the C-shaped tracks that are connected by lift links to the side frames 60 and 64 of the rigid belt frame. For example, the C shape of track 90, which has an upper and lower flange, is visible; the vacuum pick-up bar 88 travels across the width of track 90 while suspended between the lower flange of track 90 and the lower flange of the identical track secured inboard of side frame 60. The details of links 102 and 106 are also shown; link 102 is secured to side frame 64 by pivot pin 162, while link 106 is secured to side frame 64 by pivot pin 164. Cross-members 78 and 74 are C-shaped beams when viewed in end elevation. Details of the mechanism 110 that lifts the track 90 and the companion track inboard of side frame 60 are also shown on a larger scale than FIG. 2. The feed out and return movement of rollers 50, 52 as belt 48 is paid out, and taken up, is shown by the directional arrows located adjacent to the rollers. Similarly, the vertically directed, up and down movement of the tracks, and the vacuum pick-up bar suspended therefrom, is indicated by the two-headed arrow.

FIG. 6 shows the C-shaped track 166 that is positioned inboard of side frame 60 and is joined thereto by a pair of lift links. Tracks 90 and 166 are identical in shape and function. The lift links for track 166 are aligned with the lift links 102, 106 for C-shaped track 90, so that the tracks, which are joined together by spacer bars 98, 100, are moved as a unit. One of the pair of lift links 168 is shown in FIG. 6; such link is secured to side frame 60 by pivot pin 170 at its upper end, while the lower end of the link has a pin 172 which projects through an opening in track 166.

One end 92 of vacuum pick-up bar 88 rests upon track 90, while the opposite end 174 of the vacuum bar 88 rests upon track 166. Manifold 94 is secured with screws and adhesive sealant to bar 88, and is seated within channel defined on the bar. A central bore 176 receives one end of air hose 96; the bore communicates with a first vertical channel 178 and a second vertical channel 180.

FIG. 7 shows the underside of transport belt 48, and the outline of the manifold 94 and vacuum pick-up bar 88 secured to the upper surface of the belt. The ends 92 and 174 of the vacuum pick-up bar 88, which project beyond the belt, for engagement with tracks 90, 166, are also visible.

Two openings 186, 188 are formed through the thickness of the belt, and the manifold 94 is secured to the belt 48 with channels 178 and 180 in alignment with the openings. Belt 48 is a laminate of plastisol and polyester fabric. The plastisol is removed, or omitted, in an area of the belt conforming in shape to the platen, but slightly larger in size. The polyester fabric appears as a mesh-screen 190 in FIG. 7. Mesh screen 190 extends across the openings 186, 188 so that the air flows through the belt. By virtue of this arrangement, a vacuum pump 214 (shown in FIG. 8) can deliver suction forces over air hose 96 to manifold 94 and thence through channels 178, 180 and aligned holes in the bar 88 and belt to the underside of the transport belt 48. The suction forces cause photosensitive material to adhere to belt 48, so that the belt can advance such material through successive steps in the operation of the daylight camera employing this film transport assembly. The channels need not be cylindrical over their entire length, but may widen out at their lower ends to form a larger air inlet area.

A rectangular, rigid main frame 192, comprising front channel 194, side channel 196, rear channel 198, and side channel 200 extends about the transport belt 48 and the related assemblies for advancing and returning such belt, as well as raising and lowering same, at appropriate times in the operational cycle of the camera system. A hinge 202 joins the main frame to the frame of the camera system, so that the main frame may be lifted upwardly to allow inspection, or repair, to the components housed therewithin. An air cylinder 204 retains the frame in its "up" position, and also controls its gradual downward motion toward its closed position.

CYCLE OF OPERATION

Figure 9:
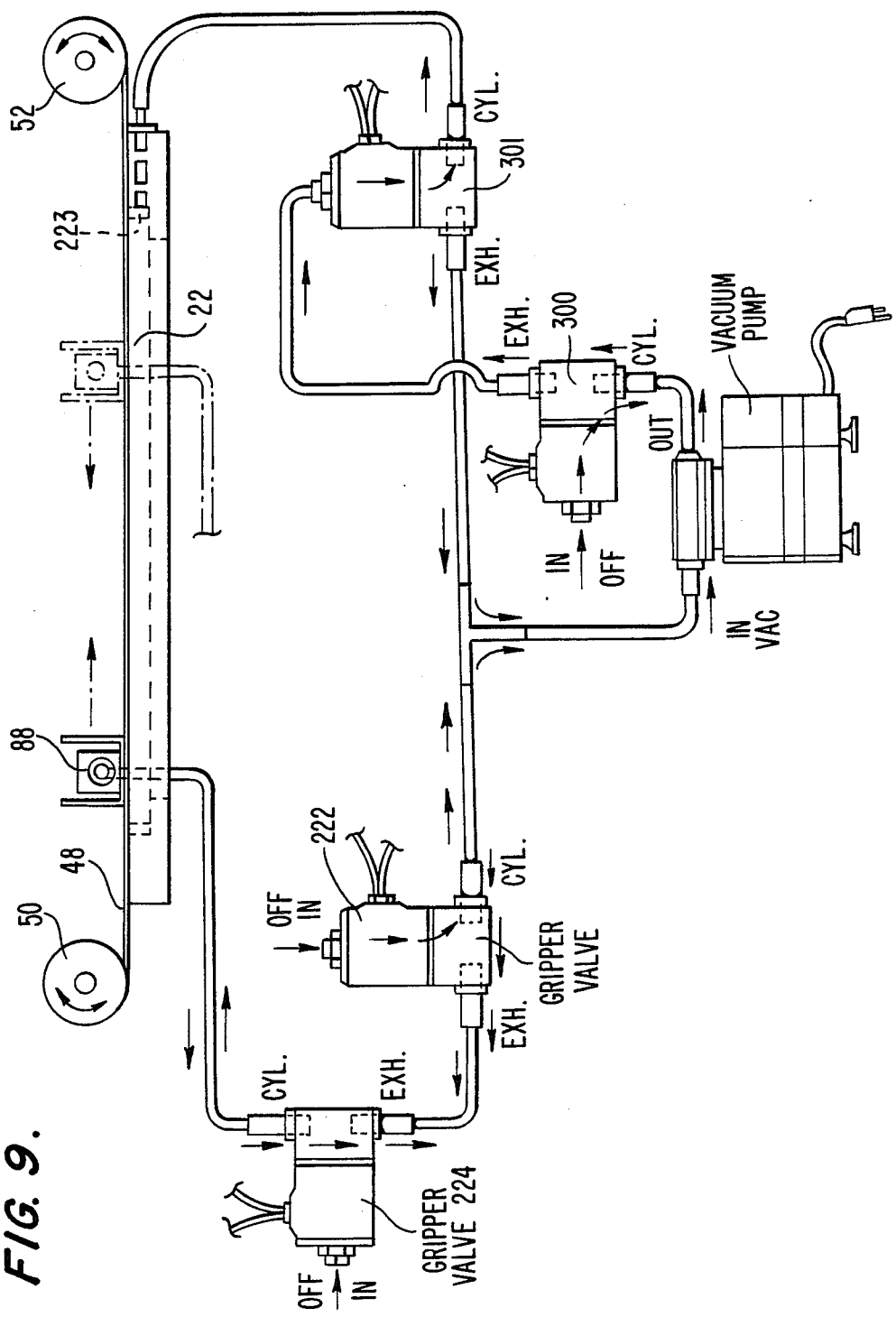
FIG. 9 is a schematic representation of the pneumatic circuit employed within the vacuum feed and hold down assembly.

The sequence of operation for the above-described preferred embodiment of an automatically operated volume feed and hold down assembly system for a daylight camera is best understood by reference to FIGS. 8 and 9. Rollers 16, 18 withdraw a length of photosensitive material from roll 14 retained in cassette 12. The rollers are powered by gear 206, which is driven by chain 208 that passes about sprocket 210. A first motor 212 delivers power to sprocket 210.

The leading edge of photosensitive material F is advanced by rollers 16, 18 beyond roller 50 and onto platen 22 to a start position A. At position A, the vacuum pump 214 is turned on and suction forces are delivered over air hose 94 to manifold 94. The forces are distributed through bores 178, 180 to the underside of belt 48 so that the photosensitive material is adhered thereto. The lift mechanism 110, including lift motor 118, is then actuated so that tracks 90, 166 are lifted relative to side frames 60, 64; the lifting motion picks up the vacuum pick-up bar 88 so that the emulsion side of the photosensitive film is spaced a small distance above the plane of the platen. The drive mechanism 126, including reversible motor 128, drive sprocket 130, and chain 132, is then energized. The movement of chain rotates rollers 50, 52 so that transport belt 48 is then advanced a calculated distance to station B with the lift assembly remaining in the raised position. A second motor 216 is then turned on and such motor drives a cable 218 which moves rotary cutter 220 across the photosensitive material. The vacuum pump 214 delivers suction forces to the manifold 94 and to the underside of the transport belt 48 all the time so the photosensitive sheet material adheres to the belt during the transport cycles. During the cut cycle the lift assembly still remains in the raised location. The drive assembly 126 rotates rollers 50, 52 to advance transport belt 48. The lifting assembly is then de-energized and the cut sheet of photosensitive material is positioned at station C. The entire cut sheet is now in contact with glass platen 22.

Placement of the cut length of photosensitive material at station C insures that the photosensitive material is centered upon the platen. After centering, three-way valve 222 terminates the suction forces flowing to transport belt 48, and directs such forces to a vacuum holddown channel 224 that runs about the perimeter of platen 22. The suction forces present in channel 224 draw the cut length of photosensitive material F against the platen, and also pull flexible, opaque belt 48 snugly thereagainst. While the cut length of photosensitive material is pressed tightly against the platen, an exposure is made of the graphic arts materials placed upon the copyboard 24.

After the exposure, the suction forces to channel 223 are terminated. Switching valves 300, 301 momentarily will supply a positive airflow to channel 223 which will break the residual vacuum between belt 48 and platen 22. Then the airflow is directed to the gripper to provide suction forces via air hose 96. The cut sheet is then moved, in the raised position, with the belt toward rollers 28, 30. To move the belt the drive assembly 126 is activated to rotate rollers 50, 52 and the photosensitive material F is advanced to station D.

At station D, the lifting frame remains raised but the suction force to belt 48 is terminated after the cut sheet has entered the nip of rollers 28, 30 which at this point are stationary. The rollers 28, 30 then start rotating and the photosensitive material is directed toward transfer cartridge 34 (if a plate is to be made) or toward developer section 46. The drive assembly 126 is again energized by lugs 150, 152 on chain 132 cooperating with switches 156, 160 so that the direction of chain travel is reversed; the reversal of chain travel is transmitted to rollers 50, 52 so that the transport belt 48 is returned to its starting position, position A.

In order to insure the delivery of the suction forces produced by vacuum pump 214 to the manifold 94, or to the channel 223, or to be vented, at the proper time in the sequence of operations, a vent valve 224 is utilized in conjunction with three-way valve 222. Valves 222, 224 may be solenoid operated valves, responsive to timed control signals. A central processing unit provides the command signals to the lift assembly, drive assembly, vacuum pump, etc., to coordinate the timing for the diverse components of the daylight camera system, particularly the unique automatically operated vacuum feed system therefor.

Whereas a preferred embodiment of the vacuum feed system has been described above, numerous changes in such system will occur to the skilled artisan. The invention, for example, may find application in known cameras, X-ray equipment, photocopiers, and the like. While the transport belt may be made of a single ply of flexible plastic or rubber, the belt is usually formed of two, or more, piles of material glued together. Also, a pivot pin 226 (FIG. 2) may be used for further adjustment of the belt frame and the belt with respect to glass platen 22.

Transport belt 48, per se, is of a unique construction. The body of the belt is a polyester fabric which approximates a fine mesh screen. Plastisol is sprayed, dipped, or otherwise applied to both surfaces of the fabric except for a "window" area within the belt. This window is rectangular in shape and is slightly larger in size than the platen of the camera system. The manifold 94 is secured to the belt within the confines of the window. When suction is applied to the manifold, the mesh enhances its gripping action. When suction is applied about the platen, the mesh facilitates the drawing down of the sheet of photosensitive material centered on the platen. The belt is preferably black in color to increase its ability to prevent stray light from entering the camera system. Because of its construction, the belt exhibits excellent conformance characteristics with regard to rollers 50, 52, and is almost air-tight when drawn down against the platen of the camera system.

Consequently, the appended claims should not be limited to their exact terms, but should be liberally construed in a manner consistent with the significant achievements in the useful arts and sciences realized by this invention.

What is claimed is:

1. A vacuum feed and hold down assembly for a camera system including a supply of photosensitive material, a camera with a platen to receive the photosensitive material and a lens system to expose the photosensitive material, and processing station for developing the exposed photosensitive material, said vacuum feed and hold down assembly comprising:
  (a) a first roller located at the side of the platen and a second roller located at the opposite side of the platen,
  (b) a flexible, opaque transport belt having one end attached to said first roller and having its other end attached to said second roller,
  (c) a vacuum pick-up bar attached to the upper surface of said opaque belt, a plurality of openings defined through said bar,
  (d) a manifold joined to said pick-up bar,
  (e) said manifold including a central bore and a plurality of depending channels in communication therewith,
  (f) a plurality of openings formed through said transport belt, said manifold being positioned atop said belt so that said channels are in registry with said openings in said pick-up and said openings in said bar,
  (g) a conduit connected to said central bore in said manifold so that suction forces from a vacuum source can be delivered to the underside of said transport belt to draw the photosensitive material thereagainst; and
  (h) a rigid belt frame for maintaining the transport belt parallel to the platen, said belt frame comprising a first side frame that extends longitudinally between said first and second rollers, a second side frame that extends longitudinally between said first and second rollers, and a plurality of cross-members that extend laterally across the belt, at spaced intervals, to maintain said side frames parallel to each other.

2. A vacuum feed and hold down assembly for a camera system as defined in claim 1 wherein three cross-members are utilized, two of said cross-members being C-shaped channels when viewed in end elevation.

3. A vacuum feed and hold down assembly for a camera system as defined in claim 1 wherein a plurality of support feet is provided for said rigid belt frame, one foot being secured to each corner of said belt frame, each foot being adjustable in height so that said belt frame can be maintained parallel to said glass platen.

4. A vacuum feed and hold down assembly for a camera system as defined in claim 1 wherein a drive assembly is provided to impart rotational movement to said first and second rollers to pay out, and take up, the transport belt, said first roller being mounted upon a first elongated shaft and said second roller being mounted upon a second elongated shaft, said drive assembly including a motor, a sprocket driven by said motor, a first idler secured to said first elongated shaft and a second idler secured to said second elongated shaft, an endless chain trained about said sprocket and said idlers, and means for driving said chain, alternately in a first direction to pay out said transport belt and in a second direction to take up said transport belt.

5. A vacuum feed and hold down assembly for a camera system as defined in claim 4 wherein said means for driving said chain in alternate directions includes lugs projecting from said chain and a pair of switches positioned in the path of movement of said lugs, one of said switches being tripped when the chain moves in one direction and the other of said switches being tripped when the chain moves in the opposite direction.

6. A vacuum feed and hold down assembly for a camera system as defined in claim 4 wherein said motor is a reversible motor, and an elastic coupling is provided between said first elongated shaft and the roller secured thereto.

7. A vacuum pump and hold down assembly for a camera system as defined in claim 1 wherein said transport belt is black in color, is larger than the glass platen of the camera, and is executed in a material that is supple and can conform to the curvature to the first and second rollers about which it is wrapped.

8. A vacuum feed and hold down assembly for a camera system as defined in claim 7 wherein said transport belt is formed of multiple plies of a plastic material joined together.

9. A vacuum feed and hold down assembly for a camera system as defined in claim 1 wherein a channel is formed around the perimeter of said platen, and said vacuum source comprises a vacuum pump, said vacuum pump communicating alternately with said manifold and said channel.

10. A vacuum feed and hold down assembly for a camera system as defined in claim 9 wherein solenoid operated valves are disposed between said vacuum pump and said manifold and said channels, said valves controlling the direction of flow of suction forces from said vacuum pump.

11. A vacuum feed and hold down assembly for a camera system as defined in claim 1 wherein said flexible opaque transport belt is formed of a laminate of polyester fabric coated with plastisol.

12. A vacuum feed and hold down assembly for a camera system as defined in claim 11 wherein a selected area of said belt comprises only of polyester fabric so that said selected area can be drawn tightly against the platen of the camera system.

13. A vacuum feed and hold down assembly for a camera system including a supply of photosensitive material, a camera with a platen to receive the photosensitive material and a lens system to expose the photosensitive material, and a processing station for developing the exposed photosensitive material, said vacuum feed and hold down assembly comprising:
(a) a first roller located at the side of the platen and a second roller located at the opposite side of the platen,
(b) a flexible, opaque transport belt having one end attached to said first roller and having its other end attached to said second roller,
(c) a vacuum pick-up bar attached to the upper surface of said opaque belt, a plurality of openings defined through said bar, said vacuum pick-up bar extending laterally across the width of said transport belt, one end of said bar terminating in a first upstruck ear and the other end of said bar terminating in a second upstruck ear,
(d) a manifold joined to said pick-up bar,
(e) said manifold including a central bore and plurality of depending channels in communication therewith,
(f) a plurality of openings formed through said transport belt, said manifold being positioned atop said belt so that said channels are in registry with said openings in said pick-up bar and said openings in said bar,
(g) a conduit connected to said central bore in said manifold so that suction forces from a vacuum source can be delivered to the underside of said transport belt to draw the photosensitive material thereagainst,
(h) a first C-shaped longitudinally extending track provided above and along one side of the platen,
(i) a second C-shaped longitudinally extending track provided above and along the opposite side of the platen, said first upstruck ear on said vacuum pick-up bar resting on said first track and said second ear of said vacuum pick-up bar resting on said second track, whereby said vacuum pick-up bar can slide freely along said tracks as said transport belt is moved across the platen, and
(j) lift means for elevating said first and second tracks and said vacuum pick-up bar suspended therefrom.

14. A vacuum feed and hold down assembly for a camera system as defined in claim 13 wherein spacer bars extend between said first and second tracks to maintain same parallel and in alignment, and said lift means are secured to one of said spacer bars.

15. A vacuum feed and hold down assembly for a camera system as defined in claim 14 wherein said lift means includes a lift motor, and a drive link secured between said lift motor and one of said spacer bars to achieve upward and downward movement of said tracks.

16. A vacuum feed and hold down assembly for a camera system as defined in claim 15 wherein said lift means further includes a cam and a switch actuated by said cam for controlling the operation of said lift motor.

17. A vacuum feed and hold down assembly for a camera system as defined in claim 13 wherein a rigid belt frame is provided to maintain the transport belt parallel to the platen, said belt frame including a first side frame that extends longitudinally between said first and second rollers, and a second side frame that extends longitudinally between said first and second rollers, a plurality of cross-members that extend laterally across the belt, at spaced intervals, to maintain said side frames parallel to each other, said lift means further including a plurality of lift links secured between said side frames and said tracks so that said tracks can be moved relative to said side frames.

18. A vacuum feed and hold down assembly for a camera system as defined in claim 17 wherein first and second lift links are secured between one of said side frames and said first track disposed inboard thereof, and third and fourth lift links are secured between the other one of said side frames and said second track disposed inboard thereof.

19. A vacuum feed and hold down system for a daylight operable camera system including a supply of photosensitive material, a platen to receive the photosensitive material and an optical system to expose the photosensitive material, said vacuum feed and hold down assembly comprising:
a movable flexible opaque transport belt disposed substantially parallel to said platen, said transport belt having at least one transport belt opening;
a vacuum pick-up bar attached to the upper surface of said transport belt, said pick-up bar having at least one pick-up bar opening corresponding to and aligned with said transport belt opening, whereby a vacuum applied to said pick-up bar is transmitted through said pick-up bar openings and said transport belt opening to the underside of said transport belt to draw the photosensitive material against said belt; and
a belt frame for maintaining the transport belt substantially parallel to the platen, said belt frame having belt lifting means for adjusting the position of said vacuum pick-up bar relative to the platen during daylight operation of said camera, said belt lifting means assuming a first, raised position wherein said vacuum pick-up bar and movable transport belt are maintained in a position disposed away from but substantially parallel to the platen for transport, said belt lifting means assuming a second, lowered position wherein said vacuum pick-up bar and said belt are lowered against the platen for hold down and exposure.

20. The vacuum feed and hold down system according to claim 19 further comprising a manifold attached to said pick-up bar, said manifold including a central bore with at least one depending channel corresponding to and in communication with said vacuum bar opening, said central bore being in communication with conduit means connected to a vacuum source.

21. The vacuum feed and hold down system according to claim 19 wherein a channel is formed around the perimeter of said platen and said vacuum pick-up bar and said channel alternately communicate with the same vacuum source.

22. The vacuum feed and hold down system according to claim 19 wherein said transport belt further comprises a woven fabric.

23. The vacuum feed and hold down system according to claim 22 wherein said woven fabric is coated with an air-tight sealant on both sides thereof except for a window area on the bottom of said belt corresponding to and overlying said platen and at least one area on the top surface of said belt corresponding to and forming said transport belt opening.

24. A method of transporting photosensitive material in a daylight camera system including a platen to receive the photosensitive material, an optical system to expose the photosensitive material, and a processing station for developing the exposed photosensitive material, said method comprising the steps of:
providing a vacuum feed and hold down assembly including,
(i) a movable flexible opaque transport belt disposed substantially parallel to said platen, said transport belt having at least one transport belt opening;
(ii) a vacuum pick-up bar attached to the upper surface of said opaque belt, said pick-up bar having at least one pick-up bar opening defined through said bar aligned with said transport belt opening, said pick-up bar being connected to a vacuum source;
(iii) a belt frame mounted above said platen, said belt frame being provided with lifting means for adjustably supporting said vacuum pick-up bar and said transport belt relative to said platen;
applying suction to said vacuum pick-up bar to adhere said photosensitive material to said belt;
activating said lifting means to support said vacuum pick-up bar and said belt away from and substantially parallel to said platen;
advancing said movable belt across said platen in a position disposed away from said platen.

25. The method according to claim 24 wherein said movable belt is advanced until said photosensitive material is centered over said platen, further comprising the following additional steps,
activating said lifting means to lower said belt and said photosensitive material onto said platen;
applying vacuumm to a peripheral channel disposed around the perimeter of said platen to draw said belt and said photosensitive material onto said platen;
terminating said vacuum to said vacuum pick-up bar; and
exposing said photosensitive material.

26. The method according to claim 25 further comprising the following additional stages performed after exposure;
disconnecting said vacuum from said peripheral channel after exposure,
re-applying said vacuum to said vacuum pick-up bar to adhere the photosensitive material to the belt,
activating said lifting means to lift said vacuum bar and said flexible belt with the photosensitive material adhered thereto away from said platen, and
advancing said movable belt to advance the photosensitive material for processing.

27. The method according to claim 24 wherein said transport belt is formed by:
providing a belt of porous material having a first side designated to face said platen and a second side designated to face away from said platen;
selectively coating said first side of said porous material with a sealant in substantially all areas surrounding said platen, thereby providing a substantially uncoated window area to overlap at least a portion of said platen; and
selectively coating said second side of said porous material in substantially all areas overlying said platen except for at least one small uncoated area in communication with said said window area to define said transport belt opening through said porous material.

28. The method according to claim 27 wherein said porous material further comprises a porous woven fabric.

* * * * *

UNITED STATES PATENT AND TRADEMARK OFFICE
CERTIFICATE OF CORRECTION

PATENT NO. : 4,772,923

DATED : September 20, 1988

INVENTOR(S) : Juergen Lein

It is certified that error appears in the above-identified patent and that said Letters Patent is hereby corrected as shown below:

Column 2, line 5, after "as well as" insert --elongated plastic strips that enable the plastic sheet--

Column 2, line 67, "feed" should read --feet--

Column 7, line 47, "volume" should read --vacuum--

Column 7, line 58, "hose 94" should read --hose 96--

Column 10, line 40, "pump" should read --feed--

Column 10, line 44, second "to" should read --of--

Column 10, line 59, "channels" should read --channel--

Column 10, line 68, "comprises" should read --consists--

Column 14, line 1, "vacuumm" should read --vacuum--

Signed and Sealed this

Fourteenth Day of February, 1989

Attest:

DONALD J. QUIGG

Attesting Officer

Commissioner of Patents and Trademarks